United States Patent [19]

Neal et al.

[11] Patent Number: 6,070,211
[45] Date of Patent: May 30, 2000

[54] DRIVER/RECEIVER CIRCUITRY FOR ENHANCED PCI BUS WITH DIFFERENTIAL SIGNALING

[75] Inventors: Danny Marvin Neal, Round Rock; Charles Bertram Perkins, Jr., Cedar Park, both of Tex.; Richard Allen Kelley, Apex, N.C.; Paul Lee Clouser, Stamford, Conn.

[73] Assignee: International Business Machines Corporation, Armonk, N.Y.

[21] Appl. No.: 08/872,823

[22] Filed: Jun. 11, 1997

[51] Int. Cl.$^7$ .................................................. G06F 13/42
[52] U.S. Cl. ........................... 710/106; 710/128; 710/129
[58] Field of Search ..................... 395/306, 308, 395/309

[56] References Cited

U.S. PATENT DOCUMENTS

| | | | |
|---|---|---|---|
| 4,748,426 | 5/1988 | Stewart | 333/22 R |
| 4,882,554 | 11/1989 | Akaba et al. | 333/105 |
| 5,029,038 | 7/1991 | Covi et al. | 361/58 |
| 5,056,110 | 10/1991 | Fu et al. | 375/257 |
| 5,099,137 | 3/1992 | Lattin, Jr. | 307/147 |
| 5,216,667 | 6/1993 | Chu et al. | 370/276 |
| 5,220,211 | 6/1993 | Christopher et al. | 326/90 |
| 5,243,623 | 9/1993 | Murdock et al. | 375/220 |
| 5,257,226 | 10/1993 | McClure | 365/189.09 |
| 5,315,175 | 5/1994 | Langner | 326/21 |
| 5,341,400 | 8/1994 | Davis | 375/256 |
| 5,374,861 | 12/1994 | Kubista | 326/30 |
| 5,430,396 | 7/1995 | Morano | 326/90 |
| 5,448,704 | 9/1995 | Spaniol et al. | 395/310 |
| 5,454,725 | 10/1995 | Speiser et al. | 439/61 |
| 5,485,488 | 1/1996 | Van Brunt et al. | 375/257 |
| 5,507,002 | 4/1996 | Heil | 395/828 |
| 5,533,204 | 7/1996 | Tipley | 395/288 |
| 5,558,522 | 9/1996 | Dent | 439/65 |
| 5,559,968 | 9/1996 | Stancil et al. | 395/306 |
| 5,596,291 | 1/1997 | Runas | 327/108 |
| 5,608,883 | 3/1997 | Kando et al. | 395/309 |
| 5,621,901 | 4/1997 | Morriss et al. | 395/306 |
| 5,715,409 | 2/1998 | Bucher et al. | 395/309 |
| 5,751,978 | 5/1998 | Tipple | 395/309 |
| 5,778,204 | 7/1998 | Van Brunt et al. | 395/308 |

OTHER PUBLICATIONS

ANSI, ANSI SCSI, pp. 16–26, Apr. 23, 1986.

*Primary Examiner*—Ayaz R. Sheikh
*Assistant Examiner*—Sumati Lefkowitz
*Attorney, Agent, or Firm*—Sawyer & Associates

[57] ABSTRACT

A system of supporting differential signalling circuitry in an enhanced PCI bus within a data processing system is disclosed The enhanced PCI bus comprises a plurality of differential signal conductor pairs. A system and method in accordance with the present invention comprises a system for providing each of the plurality of differential signal pairs over a first line and a second line, the first line having a front end and a back end, the second line having a front end and a back end. The system and method includes a differential driver for driving the first line and the second line with a small voltage change of equal amounts in opposite direction to change logic states, a receiver for sensing a voltage change between the first line and the second line and a termination network coupled to the first line and second line for terminating the first line and the second line. According to the system and method disclosed herein, the present invention provides for higher frequency capability and lower noise to signal ratio, thereby allowing the enhanced PCI bus to be compatible with a legacy PCI bus.

32 Claims, 4 Drawing Sheets

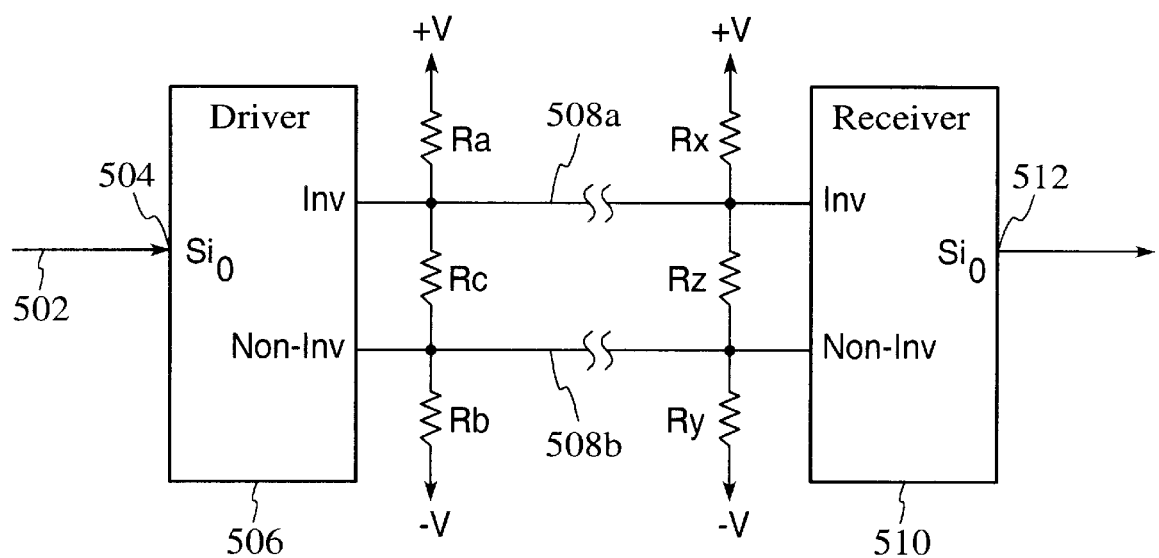
FIG. 5
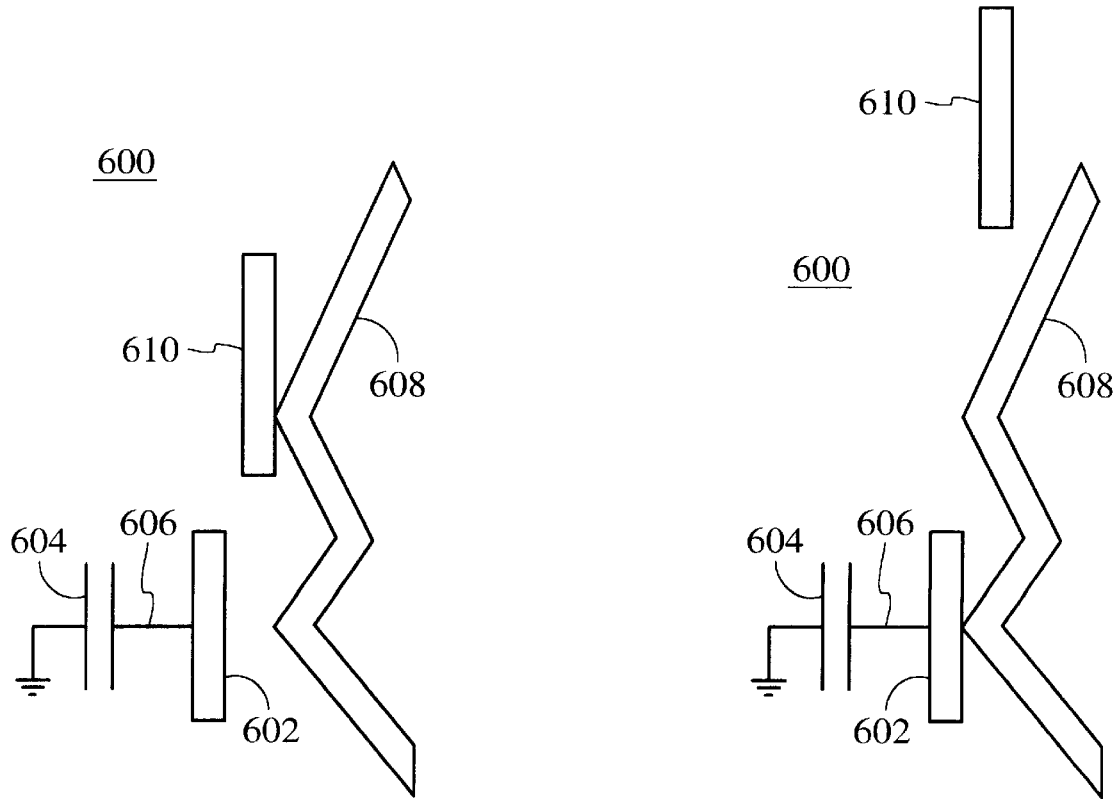
FIG. 6A
FIG. 6B

DRIVER/RECEIVER CIRCUITRY FOR ENHANCED PCI BUS WITH DIFFERENTIAL SIGNALING

CROSS-REFERENCE TO RELATED APPLICATIONS

The present application is related to application Ser. No. 08/862,824, entitled "Enhanced High Performance PCI," filed Jun. 11, 1997; and to application Ser. No. 08/873,347, entitled "New Connector for Higher Performance PCI with Differential Signaling," filed Jun. 11, 1997, issued on Mar. 16, 1999 as U.S. Pat. No. 5,884,053.

FIELD OF THE INVENTION

The present invention relates in general to bus architectures in data processing systems and in particular to circuitry employed with an enhanced PCI bus architecture. Sill more particularly, the present invention relates to providing an improved circuitry to be employed in a PCI bus architecture utilizing differential signaling.

BACKGROUND OF THE INVENTION

Data processing systems typically experience data bottlenecks under older input/output (I/O) standard architectures such as the Industry Standard Architecture (ISA) and Extended Industry Standard Architecture (EISA). These bottlenecks arise when data transfers are unable to keep pace with the requirements of a processing unit or other component within the data processing system. Alternative I/O architectures have been developed to eliminate such bottleneck by providing higher bandwidth buses. One such alternative is the peripheral component interconnect (PCI) local bus, a high performance 32-bit or 64-bit bus with multiplexed address and data lines. The mechanical, electrical, and operation characteristics for the current PCI local bus standard may be found in PCI Local Bus Specification, Revision 2.1 ("the current PCI specification"), available from the PCI Special Interest Group in Portland, Oreg. The current PCI specification and/or variants are expected to be employed in data processing systems for a considerable time into the future.

The PCI local bus specification provides a processor-independent interface to add-in boards, also commonly referred to as expansion cards or adapters. Because of AC switching characteristic limitations, a PCI bus is typically limited in both data transfer rate and fan-out (number of adapter slots supported). Data transfer rate and fan-out in a PCI bus are interdependent, such that achieving an increase in one generally results in a decrease in the other. The current 33 MHz 64-bit PCI architecture definition provides a peak data transfer rate of 264 MB/s and supports up to 4 slots per PCI I/O bus. This data rate is slow for many high performance adapters under contemporary workstation requirements. The current 66 MHz PCI architecture definition provides a peak data transfer rate of 528 MB/s, but only supports up to 2 slots per PCI I/O bus. This fan-out is extremely restrictive, limiting the usefulness of 66 MHz PCI architecture.

A high performance, general purpose parallel I/O bus similar to PCI, but with better performance and fan-out than provided by the current 66 MHz PCI definition, may be provided. The enhanced bus architecture builds upon the current 66 MHz PCI architecture but is not directly backwards-compatible with the existing PCI bus architecture specification since the connectors employed for the existing PCI bus architectures cannot be employed for the enhanced bus architecture. It would be desirable, therefore, to provide circuitry supporting the enhanced bus architecture.

SUMMARY OF THE INVENTION

It is therefore one object of the present invention to provide an improved bus architecture enabling higher frequency and performance capability for data processing systems.

It is another object of the present invention to provide circuitry employed with the enhanced bus architecture described, enabling higher frequency and performance capability.

It is yet another object of the present invention to provide an improved circuitry to be employed in an enhanced bus architecture utilizing differential signaling.

The foregoing objects are achieved as is now described. An enhanced PCI bus architecture utilizing differential signaling is supported by an adapter slot connector providing a make-before-break connection between a bus conductor and a dummy load for each bus conductor. The dummy load simulates the signal load of an adapter inserted into the slot. The PCI bus conductor is automatically disconnected from the dummy load and connected to the adapter pin when an adapter is inserted into the slot. A balanced load bus is thus provided regardless of whether adapter slots are populated or empty.

The above as well as additional objects, features and advantages of the present invention will become apparent in the following detailed written description.

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

BRIEF DESCRIPTION OF THE DRAWINGS

FIG. 5 is a block diagram of a single direction differential driver-receiver network in accordance with the present invention.

FIG. 6a is a block diagram of one embodiment of dummy load in accordance with the present invention while a device is connected.

FIG. 6b is a block diagram of one embodiment of dummy load in accordance with the present invention while a device is not connected.

DETAILED DESCRIPTION OF THE INVENTION

The present invention relates to an improvement in circuitry for use with PCI compatible buses. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
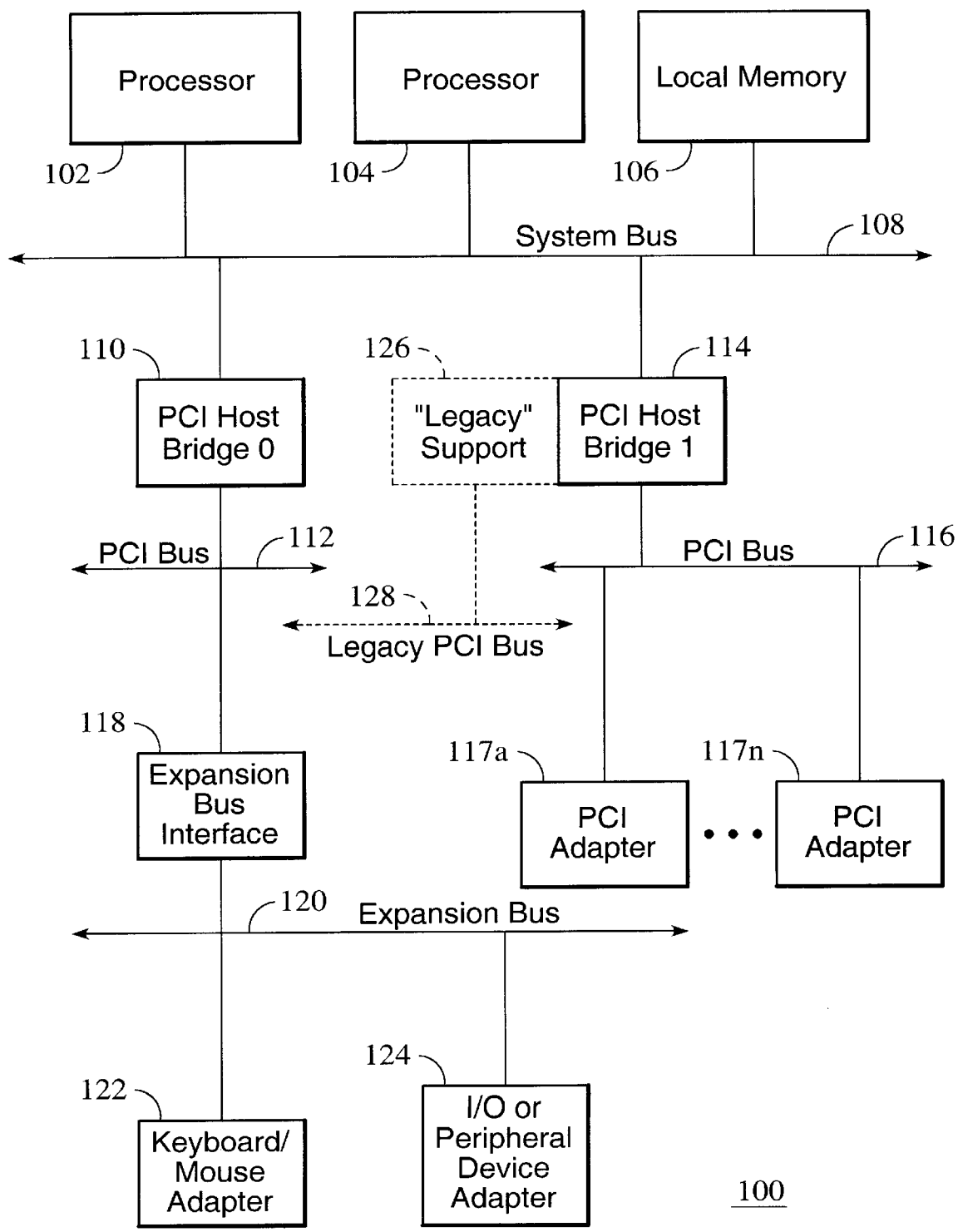
FIG. 1 depicts a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, an RS/6000™ system, a product of IBM Corporation of Armonk, N.Y. Data processing system 100 thus includes processors 102 and 104 and local memory 106 connected to system bus 108. Also connected to system bus 108 is a host bridge ("PCI Host Bridge 0") 110, which provides an interface between system bus 108 and PCI bus 112. Additional host bridges, such as host bridge ("PCI Host Bridge 1") 114, provide similar interfaces between system bus 108 and PCI buses. Host bridge 114 provides an interface to PCI bus 116. At least one PCI adapter card 117a-117n may connect to PCI bus 116.

Connected to PCI bus 112 are PCI adapter cards and/or expansion bus 118, which provides an interface between PCI bus 112 and expansion bus 120. Expansion bus 120 may be an ISA or EISA bus, and provides slots for connection of input devices such as keyboard/mouse adapter 122. Other I/O or peripheral devices, such as a CD-ROM, may also be connected to expansion bus 120 through device adapter 124.

Those skilled in the art will appreciate that the hardware depicted in FIG. 1 may vary. For example, other peripheral devices such as optical disk drives and the like also may be utilized in addition to or in place of the hardware depicted. The example depicted is not meant to imply architectural limitations. Any data processing system which utilizes a PCI bus architecture or other bus architectures may also employ the present invention.

In accordance with a preferred embodiment of the present invention, at least one host bridge and PCI bus pair depicted in FIG. 1 implements an enhanced PCI bus architecture. For example, host bridge 114 and PCI bus 116 may implement the enhanced PCI bus architecture (enhanced PCI) of the present invention, while host bridge 110 and PCI bus 112 may implement a bus conforming to the existing PCI bus architecture specification ("legacy PCI"). The enhanced PCI bus 116 supports existing PCI protocols and signal ordering rules. Functional operations, such as Retry, of the existing PCI bus architecture are also supported. The enhanced PCI bus architecture supports a 32-bit Address/Data bus, and may support a 64 bit Address/Data bus if the pin count for such support can be provided.

While supporting much of the existing PCI bus architecture protocols, the enhance PCI bus architecture employs differential signaling on the host bridge, PCI bus, and devices or adapter cards connected to the enhanced PCI bus. Thus, two signal lines are required for each signal in the enhanced PCI bus architecture definition. A new connector for the enhanced PCI architecture must also be defined. Adding the differential signaling environment should be transparent to the PCI protocol, and an increased frequency may be achieved, scalable up to a maximum frequency dependent on the driver/receiver technology selected. When operating at a significantly higher frequency, PCI timing requirements must be adjusted based on the driver/receiver technology employed and actual maximum frequency selected.

Because much of the existing or "legacy PCI" is supported, host bridge 114 for enhanced PCI bus 116 may provide integral legacy support 126 for a legacy PCI bus 128. The same circuits may be employed for some operations required of host bridge 114/126, with the exception of the receiver and output driver and other circuits to the separate buses 116 and 128. Thus a single enhanced/legacy PCI bridge 114/126 may support connections to both enhanced and legacy PCI devices, although on separate buses. Alternatively, a separate bridge connected to enhanced PCI bus 116 may provide bridge support connection to legacy PCI devices.

Figure 2A:
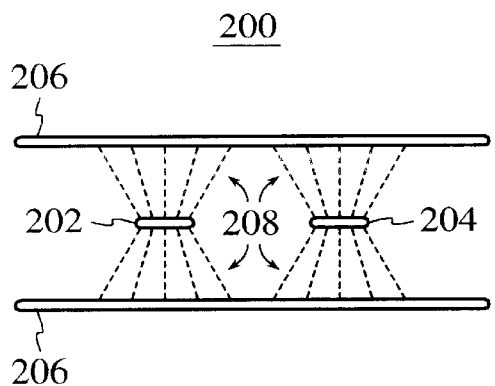
FIGS. 2A–2B are comparative diagrams of signal lines on a backplane or adapter card within a data processing system.
Figure 2B:
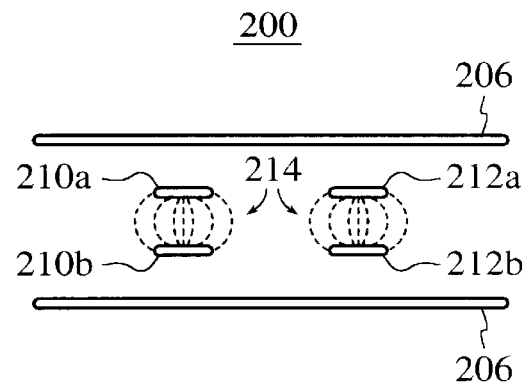

Referring to FIG. 2A and 2B, comparative diagrams of signal lines on a backplane or adapter card within a data processing system are illustrated. FIG. 2A illustrates the effect of employing conventional signal lines. Conventional single-ended signal detection currently employed by the PCI bus architecture requires detection of a signal level (high or low) with respect to ground. Capacitive cross-coupling between the signal lines 202 and 204 and ground 206 results in electromagnetic field 208. Energy is thus expended during transfer of information on the bus for charging and discharging bus capacitances. Signal lines may also cross-couple or interfere between each other, creating noise problems.

FIG. 2B illustrates a signal line pair arrangement for a backplane or adapter card within an enhanced PCI bus in accordance with a preferred embodiment of the present invention. The signal line arrangement illustrated is applicable to PCI base systems as well as to other systems. Rather than conventional single-ended signal lines presently used in PCI bus architectures, differential signal line pairs 210a–210b and 212a–212b are employed. A differential signal requires two lines per signal, and information is transferred by detecting with a polarity or a magnitude of a voltage difference between the two signal lines.

Signal line pairs 210a–210b and 212a–212b preferably transmit signals which are equal in magnitude but opposite in polarity. That is, if signal line 210a carries a signal of 1.0 V, signal line 210b simultaneously carries a signal of −1.0 V. As a result, the electromagnetic field between a signal line pair, such as signal line pair 210a–210b, and ground 206 is negligible, since the electromagnetic field between one signal line 210a and ground 206 cancels the electromagnetic field between the other signal line between 210b and ground 206. Only the electromagnetic field 214 between signal lines in a signal line pair—between signal lines 210a and 210b, for example—remains significant. As shown, the electromagnetic field formed between differential signal lines in a signal line pair is much smaller and more localized than the electromagnetic filed between a conventional single-ended signal line and ground. Therefore, when compared to the conventional signaling environment, a much lower signal transition is required to transfer information. Less energy is expended on the bus charging and discharging capacitance during transfer of information. Moreover, utilizing differential signaling improves noise immunity and allows higher transfer rates to be achieved.

As much as possible, the differential signal line pairs 210a–210b and 212a–212b are routed together on the motherboard and add-in adapter cards employed in the data processing system. This assures that the differential signaling benefits—the canceling effect of cross-coupling between signal lines and ground or other signal lines—are realized. However, routing signal line pairs together precludes backward-compatibility with legacy PCI bus connectors, which do not include physical space within the connector definition for the additional signal lines required.

Figure 3A:
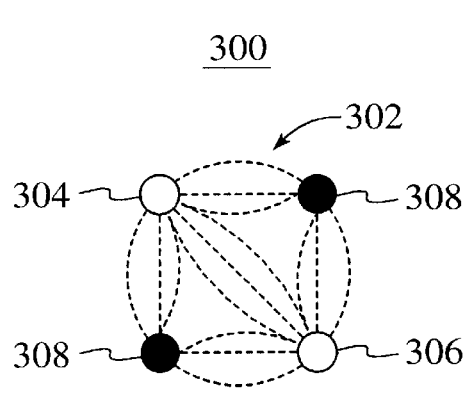
FIGS. 3A–3B depict comparative diagrams of pin layouts for an adapter card connector within a data processing system.
Figure 3B:
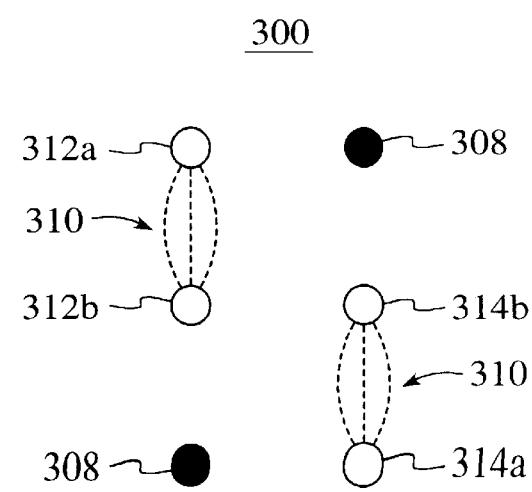

With reference to FIGS. 3A and 3B, comparative diagrams of pin layouts for an adapter card connector within a data processing system are depicted. FIG. 3A depicts a conventional signal pin arrangement. The electromagnetic filed 302 between signal pins 304 and 306 and ground pins 308 may be substantial, as shown. FIG. 3B depicts a differential signal pair arrangement for an enhanced PCI bus in accordance with a preferred embodiment of the present invention. The connector pin arrangement depicted would be applicable to PCI based systems as well as to other systems. To take advantage of the benefits of differential signaling and for signal quality, each of the two pins forming a differential pair are placed adjacent to each other in the connector. Similar to the signal line arrangement in FIG. 2b, the electromagnetic field 310 between single pin pairs 312a–312b and 314a–314b is much smaller and more localized than found in connectors using conventional single pin arrangement for legacy PCI bus connections. A connector pin arrangement as shown also may allow an enhanced PCI bus cable using twisted pair lines for each signal pair to be 10 feet or longer for PCI bus extension.

As discussed, higher frequencies are achievable using the differential signal wiring and connector pins shown in FIGS. 2A–2B and 3A–3B. Frequencies of at least 200 MHz may be achieved. If other aspects of standard PCI architecture are modified, such as clocking data on both edges of the clock cycle, this can also contribute to higher peak data rates. In addition, if split transactions are used and pacing is restricted to data blocks, this can also contribute to higher data throughput. It is estimated that data rates of approximately 1.5 gigabytes per second may be achieved.

The PCI protocol environment should be transparent to the differential signals used in conjunction with the differential circuitry and the connector. Thus, PCI protocols should be capable of supporting higher frequencies. The maximum frequency achievable is, in large part, a function of the driver and receivers selected. However, at significantly higher frequencies, PCI timing requirements may require adjustment due to the driver, receiver, and frequency selected.

Another advantage of a differential signal is the ability to terminate the line, so that a balanced load is driven. Balancing the load, making the network have the same impedance as the load being driven, eliminates reflections. Consequently, unlike the conventional systems discussed previously, reflections are not relied upon to bring a particular device up to the signal level. Proper termination also improves signal quality.

Figure 4:
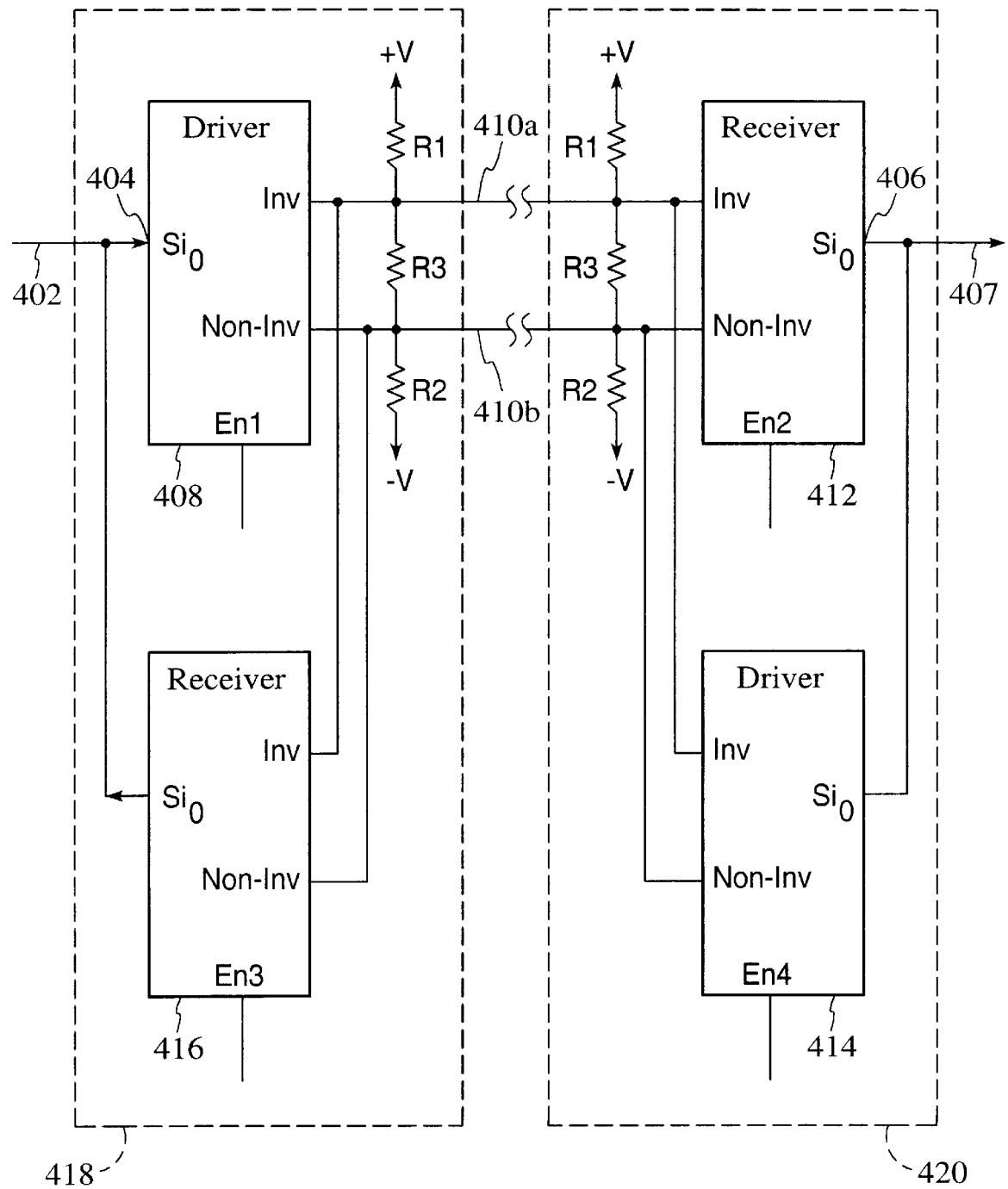
FIG. 4 is a block diagram of a bi-directional differential transceiver network in accordance with the present invention.

Referring to FIG. 4, a block diagram of a bi-directional signaling net for an enhanced PCI bus utilizing differential signaling in accordance with a preferred embodiment of the present invention is illustrated. This type of signaling net may be employed for all Address/Data signal lines in an enhanced PCI bus which require bi-directional capability. Signaling net 402 receives and transmits at an input/output 404 a single-ended signal from an enhanced PCI bus master (not shown). The bus master may be a PCI host bridge or any other PCI device capable of acting as a PCI bus master. Signaling net 407 transmits and receives a single-ended signal from an enhanced PCI bus target (not shown) at input/output 406. The bus target may be an adapter card or any other PCI device serving as a PCI bus target. Both the bus master and the bus target according to the present invention utilize the enhanced PCI bus definition.

Input 404 is connected to single-ended-to-differential driver 408 associated with the PCI bus master, which converts the single-ended signal to a differential signal in accordance with methods known in the art. Driver 408 transmits the differential signal on differential signal line pair 410a–410b. The differential signal transmitted may indicate different states in a variety of manners. For example, two different states may be defined by a voltage difference on differential signal line pair 410a–410b which remains constant in magnitude but changes direction, such as when the polarity of the voltage difference is reversed. A first polarity may represent a first state ("high") while the opposite polarity represents a second state ("low"). Alternatively, the voltage difference on differential signal line pair 410a–410b may remain constant in direction or polarity, but change magnitude in opposite directions, with a first magnitude representing a first state and a second magnitude representing a second state. In either case, however, the voltages applied to differential signal line pair 410a–410b should have the same magnitude change but opposite directions with respect to ground, so that the cancelling effect may be achieved.

Differential signal line pair 410a–410b is also connected to receiver 412 associated with the PCI bus target, which transforms the differential signal to a single-ended signal by methods known in the art. The resulting single-ended signal is transmitted on output 406 to the PCI bus target. Since bi-directional signaling is required, a second drive 414 associated with the PCI bus target is connected to output 406 and differential signal line pair 410a–410b. Driver 414 receives single-ended signals at output 406 from the PCI bus target and transmits corresponding differential signal on differential signal line pair 410a–410b. A receiver 416 associated with the PCI bus master is connected to differential signal line pair 410a–410b and input 404, transforming differential signals received to single-ended signals and transmitting the single-ended signals to the PCI bus master.

Drivers 408 and 414 and receivers 412 and 416 each includes an enable signal input, preventing the respective devices from transmitting or receiving unless asserted. The signals applied to these enable signal inputs are coordinated to ensure that only one driver is transmitting during a given bus cycle.

In addition to cross-coupling, an additionally problem with the conventional single-ended signal lines employed in existing PCI architectures is reflective signaling, which limits the physical length of the PCI bus and thus limits fan-out. Employing balanced loads on the signal lines eliminates reflections and results in single incident signaling. Therefore, each transceiver 418 and 420 comprising a driver/receiver pair associated with either the PCI bus master or PCI bus target includes a resistive load at the connection to differential signal line pair 410a–410b. The resistive load comprises resistance R1 connected between an upper power supply voltage and one differential signal line 410a, resistance R2 connected between and lower power supply voltage and the other differential sign al line 410b, and resistance R3 connected between the differential signal lines 410a and 410b. The values of R1, R2, and R3 are selected to ensure that the loads seen by differential signal line pair 410a–410b remains substantially balanced and constant regardless of which transceiver 418 and 420 is transmitting and which is receiving. Each set of resistive load for each differential signal may be located on the mother board, one set near the PCI host bridge and the other set at the opposite end of the PCI bus.

With reference to FIG. 5, a block diagram of an alternative signaling net for an enhanced PCI bus utilizing differential signaling in accordance with a preferred embodiment of the present invention is depicted. This simpler signaling net may be employed for signal lines which do not require bi-directional capability, such as REQ#, GNT#, etc. Signaling net 502 receives single-ended signals from a bus master (not shown) at input 504 connected to driver 506. Driver 506 transforms the single-ended signals to differential signals and transmits the differential signals on differential signal line pair 508a–508b. Receiver 510 connectd to differential signal line pair 508a–508b transforms the differential signals to single signals and transmits the single-ended signals on output 512 to a bus target (not shown).

Resistive loads associated with both driver 506 and reeiver 510 ensure that differential signal line pair 508a–508b is connected to a balanee load. This is accomplished at driver 506 by resistance $R_a$ connected between an upper power supply voltage and differential signal line 508a, resistance $R_b$ connected between a lower power supply voltage and differential signal line 508b, and $R_c$ connected between differential signal lines 508a and 508b. A similar resistive load configuration is associated with receiver 510, although providing a balanced load at receiver 510 may require that different resistance values $R_x$, $R_y$, and $R_x$ be employed.

In one embodiment, the number of slots is probably limited to three or four slots. Performance of the drivers 400 and 500 can be further enhanced by balancing the load regardless of the number of devices connected to a particular network. This can be achieved through the use of a dummy load.

The dummy load could be provided to the networks 400 and 500 in a variety of ways. In an embodiment, the dummy load is provided on separate card. In a preferred embodiment, the body of a connector includes a feature which allows the insertion of a dummy load.

FIGS. 6a and 6b depict a mechanism 600 for balancing the load using dummy loads. This mechanism 600 could be used in conjunction with any connector. Although FIGS. 6a and 6b depict the mechanism 600 for a single pin, the mechanism 600 can be provided for any number of pins.

FIG. 6a depicts the mechanism 600 while a device is connected to the network via pin 610. FIG. 6b depicts the mechanism 600 when the device is disconnected by moving pin 610 away from the connector. In the embodiment shown in FIGS. 6a and 6b, the dummy load is provided by a length of line 606 in series with capacitor 604 to ground. In a preferred embodiment, capacitor 604 is approximately 10 picofarads and the line 606 is one-half to one and one-half inch long. This combination of a line 606 and a capacitor 604 simulates the signal load of an adaptor plugged into the slot. In a preferred embodiment one dummy load is provided for each signal.

Referring back to FIG. 6a, when pin 610 is connected, the coupler 608 is pushed away from the connection 602 connecting the adapter through connector pin 610 and connector coupler 608 to the system network. Consequently, the capacitor 604 and the line 606 is not coupled to the network. In FIG. 6b, the pin 610 has been removed, disconnecting the device from the network. Consequently, coupler 608 is in electrical contact with connection 602. This couples the capacitor 604 and the line 606 to the driver/receiver of the backplane network, automatically balancing the load to the network.

In a preferred embodiment, the dummy load provided to the system is chosen such that the total impedance remains the same regardless of the number of devices connected to the system. Because the load can be balanced regardless of the mix of occupied and unoccupied slots, a larger number of slots can be supported. It is estimated that the mechanism 600 would allow up to eight or more slots per bus, depending on frequency selected.

It is also noted that in a preferred embodiment of the differential wiring 200 or connector 300, the entire bus would utilize differential signaling. However, nothing would prevent the use of other, non-differential buses In the preferred embodiment, all devices coupled to the differential bus would use differential signalling. In the preferred embodiment, the differential bus would be utilized for higher performance and higher data rate capabilities, such as for a high end graphics and other high speed devices.

A preferred embodiment utilizes a twisted pair for inter-machine cabling of the enhanced PCI bus utilizing differential signaling. A twisted pair is used in a preferred embodiment because the twisted pair provides greater cancellations to ground. In addition, a twisted pair provides better balancing than using signal line and shield of a cable to carry the differential signal. This is because the electric properties of the signal and shield are different, making it difficult to balance the signal.

A method and system has been disclosed for an enhanced PCI bus allowing higher frequency signal operation. In addition, higher signal quality through decreased noise is achieved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for supporting differential signalling circuitry in an enhanced PCI bus within a data processing system, the enhanced PCI bus comprising a plurality of differential signal conductor pairs, comprising:

a system for providing each of the plurality of differential signal pairs over a first line and a second line, the first line having a front end and a back end, the second line having a front end and a back end;

a single-ended to differential driver for driving the first line and the second line with a small voltage change of equal amounts in opposite direction to change logic states;

a differential to single-ended receiver for sensing a voltage change between the first line and the second line; and a termination network coupled to the first line and second line for terminating the first line and the second line;

wherein the differential to single-ended receiver and the single-ended to differential driver allow the enhanced PCI bus to be compatible with a legacy PCI bus.

2. The system of claim 1 wherein the differential driver and receiver are coupled to the front end of the first and second lines for bi-directional signal pairs.

3. The system of claim 1 wherein the differential driver and receiver are coupled to the back end of the first and second lines for bi-directional signal pairs.

4. The system of claim 1 wherein the differential driver is coupled to the front end of the first and second lines for uni-directional signal conductor pairs.

5. The system of claim 4 wherein the receiver is coupled to the back end of the first and second lines for uni-directional signal conductor pairs.

6. The system of claim 1 wherein the circuitry further comprises a plurality of ground lines for providing a ground reference for a plurality of differential signal pairs, each differential signal pair including the first line and the second line, a ground line being in close proximity to the first and second lines.

7. The system of claim 6 wherein the termination network for each differential pair further comprises first and second plurality of resistors.

8. The system of claim 7 wherein the first plurality of resistors comprises first, second and third resistors coupled to the front end of the first and second lines.

9. The system of claim 8 wherein the second plurality of resistors comprises fourth, fifth and sixth resistors coupled to the back end of the first and second lines.

10. The system of claim 8 wherein the first and third resistors provide signal mode termination at front end.

11. The system of claim 9 wherein the fourth and sixth resistors provide signal mode termination at the back end.

12. The system of claim 10 wherein the second resistor provides common mode termination at the front end.

13. The system of claim 11 wherein the fifth resistor provides common mode termination at the back end.

14. The system of claim 1 wherein the termination network provides termination with characteristic impedance in which dependence upon reflections is avoided.

15. The system of claim 1 wherein the first line and the second line further comprise differential signal lands routed adjacent to one another in close proximity on a backplane and adapter card.

16. The system of claim 1 wherein the first line and the second line further comprise a twisted pair cable when extending an enhanced PCI bus between systems via a cable.

17. A method for supporting differential signalling circuitry in an enhanced PCI bus within a data processing system, the enhanced PCI bus comprising a plurality of differential signal conductor pairs, comprising:

providing each of the plurality of differential signal pairs over a first line and a second line, the first line having a front end and a back end, the second line having a front end and a back end;

providing a single-ended to differential driver for driving the first line and the second line with a small voltage change of equal amounts in opposite direction to change logic states;

providing a differential to single-ended receiver for sensing a voltage change between the first line and the second line; and providing a termination network coupled to the first line and second line for terminating the first line and the second line;

wherein the differential to single-ended receiver and the single-ended to differential driver allow the enhanced PCI bus to be compatible with a legacy PCI bus.

18. The method of claim 17 wherein the differential driver and receiver are coupled to the front end of the first and second lines for bi-directional signal pairs.

19. The method of claim 17 wherein the differential driver and receiver are coupled to the back end of the first and second lines for bi-directional signal pairs.

20. The method of claim 17 wherein the differential driver is coupled to the front end of the first and second lines for uni-directional signal conductor pairs.

21. The method of claim 20 wherein the receiver is coupled to the back end of the first and second lines for uni-directional signal conductor pairs.

22. The method of claim 17 wherein the circuitry further comprises a plurality of ground lines for providing a ground reference for a plurality of differential signal pairs, each differential signal pair including the first line and the second line, a ground line being in close proximity to the first and second lines.

23. The method of claim 22 wherein the termination network for each differential pair further comprises first and second plurality of resistors.

24. The method of claim 23 wherein the first plurality of resistors comprises first, second and third resistors coupled to the front end of the first and second lines.

25. The method of claim 24 wherein the second plurality of resistors comprises fourth, fifth and sixth resistors coupled to the back end of the first and second lines.

26. The method of claim 24 wherein the first and third resistors provide signal mode termination at front end.

27. The method of claim 25 wherein the fourth and sixth resistors provide signal mode termination at the back end.

28. The method of claim 26 wherein the second resistor provides common mode rejection at the front end.

29. The method of claim 27 wherein the fifth resistor provides common mode termination at the back end.

30. The method of claim 17 wherein the termination network provides termination with characteristic impedance in which dependence upon reflections is avoided.

31. The method of claim 17 wherein the first line and the second line further comprise differential signal lands routed adjacent to one another in close proximity on a backplane and adapter card.

32. The method of claim 17 wherein the first line and the second line further comprise a twisted pair cable when extending an enhanced PCI bus between systems via a cable.

* * * * *